United States Patent [19]
Emanuelson et al.

[11] Patent Number: 5,447,739
[45] Date of Patent: Sep. 5, 1995

[54] MISTED MICROWAVE PANCAKES

[75] Inventors: Richard L. Emanuelson; Rosemary A. Miller; Margaret I. Skalicky, all of Columbia Heights; Lawrence P. Brigl, Brooklyn Park; Thomas A. Meyers, Parkers Prairie, all of Minn.

[73] Assignee: The Pillsbury Company, Minneapolis, Minn.

[21] Appl. No.: 257,492

[22] Filed: Jun. 9, 1994

Related U.S. Application Data

[63] Continuation of Ser. No. 25,931, Mar. 3, 1993, abandoned, which is a continuation of Ser. No. 828,770, Jan. 30, 1992, Pat. No. 5,277,925.

[51] Int. Cl.⁶ ............................................. A21D 15/08
[52] U.S. Cl. ................................. 426/552; 426/94; 426/95; 426/241; 426/293; 426/296; 426/455; 426/506; 426/511; 426/524
[58] Field of Search ..................... 426/94, 95, 293, 296, 426/241, 552, 455, 506, 511, 524

[56] References Cited

U.S. PATENT DOCUMENTS

| | | |
|---|---|---|
| 3,565,014 | 2/1971 | Mendoza . |
| 3,865,965 | 2/1975 | Davis et al. . |
| 3,983,256 | 9/1976 | Norris et al. ........................... 426/94 |
| 4,303,687 | 12/1981 | Ratjen . |
| 4,788,067 | 11/1988 | Seneau . |
| 4,933,196 | 6/1990 | Yasosky et al. . |
| 4,935,252 | 6/1990 | Huang et al. . |
| 4,978,542 | 12/1990 | Buckley . |
| 4,991,403 | 2/1991 | Kirchhoff . |
| 5,035,904 | 7/1991 | Huang et al. . |
| 5,049,398 | 9/1991 | Saari et al. . |

OTHER PUBLICATIONS

Watt et al. 1975, Composition of Foods, Agricultural Handbook No. 8, Consumer and Food Economics Institute Agricultural Research Service, USDA, p. 42.
Bernice K. Watt and Annabel L. Merrill, Composition of Foods, (Dec. 1963).
Meta H. Given, Modern Encyclopedia of Cooking, vol. 1 (1949).

Primary Examiner—Helen Pratt
Attorney, Agent, or Firm—Janal M. Kalis; Aleya Rahman

[57] ABSTRACT

A process and product for improving the tenderness of cooked pancakes that are microwaved. The process includes applying water to the cooked pancake so that the moisture of each pancake is increased by about 6%-to-12% to about 45%-to-52% by weight. The pancake product of the present invention has an improved tenderness when compared with other cooked microwavable pancakes, not surface-treated with water.

1 Claim, 2 Drawing Sheets

MISTED MICROWAVE PANCAKES

This is a continuation of copending application Ser. No. 08/025,931 filed on Mar. 3, 1993, now abandoned, which was a continuation of Ser. No. 07/828,770 filed on Jan. 30, 1992, now U.S. Pat. No. 5,227,925.

BACKGROUND OF THE INVENTION

The present invention relates to a process for making an improved cooked microwavable pancake and to an improved cooked microwavable pancake product.

Commercially prepared pancakes that have been cooked and then frozen tend to dry out when heated in a microwave oven. The resulting dried out pancakes have a texture that is unacceptably tough to many consumers. Indeed, pancake toughness is responsible for the highest rate of consumer complaints directed to the quality of commercially prepared microwavable pancakes.

Pancake recipes having ingredients of wheat flour, corn flour, sugar or high fructose corn syrup, buttermilk, salt, leavening, egg, shortening, and about 41% water tend to produce pancakes that are tough in texture when cooked and heated in a microwave oven. Pancake recipes having a higher water content produce pancakes that are sometimes not as tough. Unfortunately, the high water recipes do not lend themselves to conventional commercial production methods. The high water recipes produce pancakes that are fragile and that fall apart when flipped on a griddle surface. The high water recipes also produce pancakes that wrinkle when the pancakes are removed from the griddle surface.

Approaches to obtaining a desired food texture have been attempted for food products other than pancakes. The Bergstrom et al. U.S. Pat. No. 5,049,398, issued Sep. 17, 1991, describes a method for improving the crust and crumb properties of a yeast leavened bread. The method includes mixing an anti-staling dough conditioner, 20-to-100 parts of flour having a pregelatinized starch component, and about 7-to-30 parts of water into a bread material prior to baking the bread.

The Matson et al. U.S. Pat. No. 5,035,904, issued Jul. 30, 1991, describes a method for achieving a desired degree of toughness in bread. The method includes adding a texturizing agent to bread dough. The texturizing agent is selected from a group that includes surfactants, hydrogen bond-breakers, fast acting oxidants, enzymes, and disulfidereactants.

The Mendoza et al. patent, U.S. Pat. No. 3,565,014, issued Feb. 23, 1971, describes a device for spraying a roll of a tortilia-making machine with water. The water spray aids in preventing tortilla dough from sticking to the roll.

The Atwell et al. U.S. Pat. No. 4,933,196, issued Jun. 12, 1990, describes a method for controlling the texture of microwave brownies. The method includes regulating the steam retention properties of a brownie batter. The steam retention properties are adjusted by use of an emulsifier in the brownie batter.

The Buckley U.S. Pat. No. 4,978,542, issued Dec. 18, 1990, describes a method for precooking fast foods such as french fried potatoes for use in a non-fat environment like a microwave oven. The Buckley patent describes a method that includes transporting the fast food by conveyor to several cooking stations. One of the cooking stations sprays the precooked food with heated oil. The heated oil may be mixed with either water or air and is sprayed under pressure at elevated temperatures. Spraying he fast food with oil confers to the food an appearance, taste and texture like a conventionally cooked fast food. However, the fast food is not saturated with oil as it would be if immersed in a heated vat.

The Huang Hua-Fing, et al., U.S. Pat. No. 4,935,252, issued Jun. 19, 1990, describes a package for cooking a waffle in a microwave oven. The package includes a mechanism for allowing moisture to escape from the package.

SUMMARY OF THE INVENTION

The present invention includes a process for applying water to a cooked pancake in order to render the pancake more tender and palatable when heated in a microwave oven. The process of the present invention includes applying water to the microwavable pancake in order to increase the moisture of the cooked pancake by about 6-to-12 percent by weight.

The product of the present invention is a microwavable cooked pancake having a moisture level of about 45%-to-52% due to application of water to the cooked pancake. The moisture level is stable for at least approximately 100 days following freezing of the cooked pancake. The pancake of the present invention also has an improved tenderness and mouthfeel when compared to other microwavable cooked pancakes.

DETAILED DESCRIPTION OF THE PREFERRED EMBODIMENTS

Figure 1:
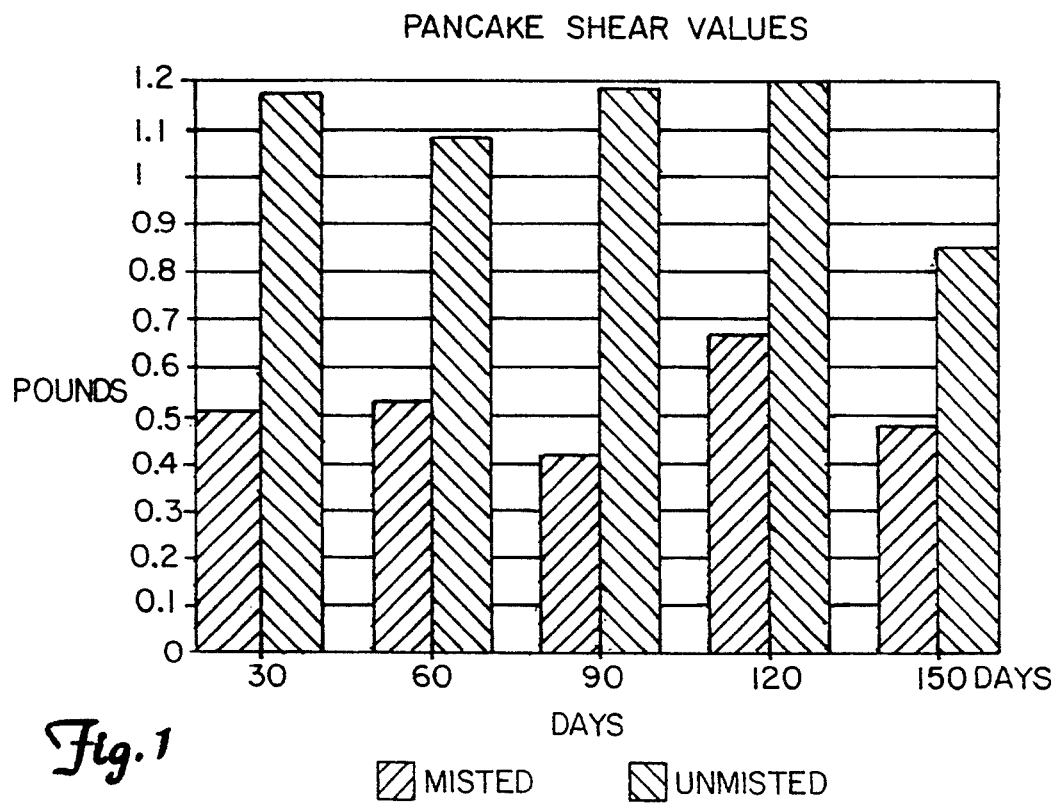
FIG. 1 is a graphical view illustrating pancake shear values over a 150 day period.

The present invention includes a process for improving the texture of cooked pancakes that are heated in a microwave oven. The present invention also includes a cooked pancake product having an improved tenderness when heated in a microwave oven.

The process for improving the texture of cooked microwavable pancakes includes preparing a pancake batter and cooking the batter with a griddle to form a cooked pancake. The cooked pancake is then transported by a conveyor from the griddle. While on the conveyer, water is applied to the cooked pancake. The pancake is then frozen and packaged.

Pancake batters suitable for use in the present invention include but are not limited to batters for buttermilk pancakes, blueberry pancakes, and maize pancakes. In one embodiment, the buttermilk pancake batter included ingredients described in Table 1. In a second embodiment, the blueberry pancakes were made from a batter that included ingredients described in Table 2. In a third embodiment, the maize pancakes were made from a batter that included ingredients described in Table 3. The three batter embodiments included a water content within an approximate range of 32-to-41 percent.

TABLE 1

FORMULA: BUTTERMILK PANCAKES
Ingredients

| | |
|---|---|
| Flour | 35–45% |
| Water | 32–38% |
| High Fructose Corn Syrup | 13–23% |
| Vegetable Oil | 1–8% |
| Buttermilk Solids | 1–5% |
| Salt | .1–1.2% |
| Soda | .4–1% |
| Sodium Aluminum Phosphate | .2–.5% |
| Albumin | .1–1% |
| Monocalcium Phosphate | .1–.4% |
| Egg Yolk Solids | .1–1% |

TABLE 2

FORMULA: BLUEBERRY PANCAKES
Ingredients

| | |
|---|---|
| Flour | 35–45% |
| Water | 32–38% |
| High Fructose Corn Syrup | 13–23% |
| Blueberries | 5–10% |
| Vegetable Oil | 1–8% |
| Buttermilk Solids | 1–5% |
| Salt | .1–1.2% |
| Soda | .4–1% |
| Sodium Aluminum Phosphate | .2–.5% |
| Albumin | .1–1% |
| Monocalcium Phosphate | .1–.4% |
| Egg Yolk Solids | .1–1% |

TABLE 3

FORMULA: MAIZE PANCAKES
Ingredients

| | |
|---|---|
| Flour | 34–45% |
| Water | 36–41% |
| High Fructose Corn Syrup | 13–23% |
| Corn Flour | 1–10% |
| Vegetable Oil | 1–8% |
| Buttermilk Solids | 1–5% |
| Salt | .1–1.2% |
| Soda | .4–1% |
| Sodium Aluminum Phosphate | .2–.5% |
| Albumin | .1–1% |
| Monocalcium Phosphate | .1–.4% |
| Egg Yolk Solids | .1–1% |

The prepared pancake batter was then added to the heated griddle. By the term "griddle" is meant any device having a relatively flat surface used to cook pancakes. A griddle also includes a device having an upper platen, a lower platen and a conveyer located between the upper platen and the lower platen to convey the batter between the platens. Both the upper platen and the lower platen include a relatively flat heated surface that faces the conveyer. The pancake batter is simultaneously cooked on one side by the upper platen and on the other side by the lower platen as the batter is transported by the conveyer. The arrangement permits the pancake batter to be cooked on the two sides without being flipped. Any other griddle embodiment conventionally used to make pancakes is suitable for use in the process of the present invention.

The pancake is typically formed into a circular shape. In one embodiment, the pancake batter was heated by the griddle for 75 seconds on one side and for 45 seconds on the other side.

In one preferred embodiment, pancakes cooked by the griddle had a diameter ranging from about 4.15 inches to about 4.50 inches. The preferred pancakes each had a thickness ranging from about 0.22 inches to about 0.25 inches. The pancakes had a weight within a range of about 37-to-37.8 grams each, when the pancakes were cooked and ready for transfer from the griddle.

Once cooked, the pancakes were transferred from the griddle and were immediately placed on a wire conveyor of conventional design. While on the conveyor, the pancakes were sprayed with a single spray nozzle that applied water to a surface of one side of the preferred pancake. The water was most preferably applied during a single pass of the pancake under the spray nozzle.

An acceptable range of temperature for the water is about 35° F.-to-75° F. The water used to spray each pancake is acceptably either potable water or demineralized water.

The spray nozzle is most preferably set up prior to a pancake cooler so that the pancakes are sprayed while warm. In one embodiment, pancakes had a temperature within a range of about 80° F.-to-170° F.

The water applied in the form of a spray in the process of the present invention includes either a heavy mist having fine droplets or a coarse spray having drops of water. In one embodiment, water was sprayed from an 18 GGSS full jet spray nozzle manufactured by Spraying System Co. of Wheaton, Ill., at a rate of about 720 gms-to-770 gms per minute. The process of the present invention most desirably adds about 3.5 grams of water to each pancake of the preferred embodiment. For all pancakes, drops and droplets of water were applied to increase the moisture of the pancake about 6-to-12% to about 45-to-52% by weight.

The water spray was preferably applied by one spray nozzle. However, in an acceptable alternative, the water spray is applied to the pancake surface by two or more consecutively arranged spray nozzles as the pancake is transported by the conveyer. The water spray nozzle is preferably positioned above an upper surface of the pancake so that drops and droplets of water fall down onto the upper surface. In one preferred embodiment, the nozzle was located about 6 inches above the surface of the pancake. Alternatively, the spray nozzle can be positioned below a lower surface of the pancake so that drops of water are sprayed upwards onto the lower surface.

Each pancake was suitably sprayed on either the upper surface, the lower surface or both the upper and lower surfaces. For two or more spray nozzles, nozzles are acceptably arranged to spray either downwardly or upwardly in order to spray both surfaces.

Water can also be applied to the cooked pancake as a water curtain. The water curtain refers to a substantially continuous sheet of water. The water curtain is suitably made by a manifold and a pipe having a plurality of orifices, holes or slots, sized and arranged so that water passing through the orifices converges to form a curtain of water. The manifold equalizes water flow through the plurality of orifices. The water curtain also adds about 3.5 gms of water to each pancake of the preferred embodiment. Water of the water curtain preferably has a temperature within the range of about 80° F.-to-170° F.

Water can also be applied to the cooked pancake by a roller. The roller preferably has a moist radial surface that contacts the surface of the pancake and transfers water from the roller to the pancake. As in other embodiments, the roller also adds about 3.5 gms of water to each pancake of the preferred embodiment. Water transferred from the roller to the pancake also has a temperature of about 80° F.-to-170° F.

Alternatively, water can be applied to the cooked pancake by exposing the pancake to a steam chamber. As in other embodiments, pancakes of the preferred embodiment are exposed to the steam chamber long enough to apply about 3.5 gms of water to each pancake.

Water should be uniformly applied to each cooked pancake in a manner to add about 6-to-12 weight percent of water to each cooked pancake. If the pancake is sprayed or rolled or steam-treated on two sides, the total amount of water applied to the pancake is still about 6-to-12 weight percent or enough water to increase the total moisture content of the pancake to about 45%-to-52% by weight.

Freezing and packaging the misted pancake is acceptably performed by any conventional method. By "misted pancake" is meant any pancake formed by the process of the present invention. In one embodiment, the pancake was blast frozen. In one other embodiment, the pancake was packaged in a poly bag with two other pancakes. The poly bag was heat sealed. The poly bag was then placed in a carton.

In one preferred embodiment of the misted pancakes of the present invention, the pancakes have a weight greater than the weight of unmisted pancakes as illustrated in Table 4. The height and diameter of the misted pancakes are also compared to unmisted pancakes in Table 4.

TABLE 4

|  | Griddle #5 Control | Griddle #3 Misted |
| --- | --- | --- |
| A. Frozen Pancake Weights | | |
| X-bar | 37.4 gms | 41.4 gms |
| R-bar | 0.8 | 0.6 |
| 1 Sigma (indiv) | 0.43 | 0.32 |
| 1 Sigma (estimated) | 0.41 | 0.32 |
| B. Frozen Pancake Stack Heights | | |
| X-bar | 1.49 in | 1.80 in |
| 1 Sigma (indiv) | 0.08 | 0.07 |
| n | 6 | 8 |
| C. Frozen Pancake Maximum Diameters | | |
| X-bar | 4.27 in | 4.38 in |
| R-bar | 0.24 | 0.16 |
| 1 Sigma (indiv) | 0.12 | 0.12 |
| 1 Sigma (estimated) | 0.12 | 0.09 |

The misted pancake product of the present invention is a more tender pancake than an unmisted pancake when heated in a microwave oven. The misted pancakes of the present invention were tested for tenderness using an Accuforce shear test and a hedonic test.

The Accuforce shear test indicated that Accuforce shear pounds were much less for misted pancakes than for pancakes which had not been misted as illustrated in FIG. 1. Specifically, misted pancakes had an Accuforce shear of only about 0.5 pounds while unmisted pancakes had a shear of over 1 pound. Also, the Accuforce shear showed virtually no reduction within a 120 day period following the making and blast freezing of the pancakes as illustrated in FIG. 1.

The Accuforce shear test was performed on an Ametek Accuforce II Model No. HL4434-6-25 pd instrument manufactured by Ametek, Inc. of Largo, Fla. Other test equipment included a Chatillion LTCM-4 Light Capacity Tester stand manufactured by Chatillion, John & Sons, Inc. of Greensboro, N.C., having a speed set at setting 8, a top cell and a bottom cell. The top cell included a metal bracket, having three sides, attached to the Ametek Accuforce. The top cell also included a wire cutter that cut through a stack of pancakes. The wire cutter was attached to two opposing sides of the metal bracket. The wire cutter included a circumference of about 0.038 inches. The force to which the wire cutter was subjected was measured by the Ametek Accuforce tester.

The bottom cell included a plastic block mounted on a base of a screw driven platform. The plastic block included a slot having a width of about ½ inches. The plastic block had a height of about 2 inches.

To perform the Accuforce shear test, the Ametek Accuforce instrument was set to read pounds of force to which the wire cutter was subjected as the cutter passed through a stack of pancakes. The instrument was also set to read within a suitable range of pounds of force. All prior instrument readings were cleared. In one test, a stack of three buttermilk pancakes was placed on a plastic plate and heated in a microwave oven. Immediately after removing from the microwave oven, the stack was cleanly cut with a sharp knife into three sections. A first cut was made along a chord of the circular pancake stack, positioned about 1¼ inches inward from an edge of the pancake. A second cut was made along a chord positioned about 1¼ inches from an opposite edge of the pancake. The second cut was parallel to the first cut. The two cuts made a first outside section, a second middle section and a third opposing outside section of the stack of pancakes.

Once the stack of pancakes was cut into the three sections, the first outside section was placed on the lower cell. The first outside section was positioned so that the wire cutter cut across the width of the first section. The wire cutter made two cuts. One cut was made about one inch from an upper edge of the first outside section. The second cut was made about one inch from a lower edge of the first outside section. The second middle section was positioned so that the wire cutter cut about 1¼ inches from an upper edge of the second middle section and about 1¼ inches from a lower edge of the second middle section. The third outside section was cut in the manner described for the first outside section. Measurements were made of pounds of force required to pass the wire cutter vertically through the stack of pancakes of each section at the two positions described.

Figure 2:
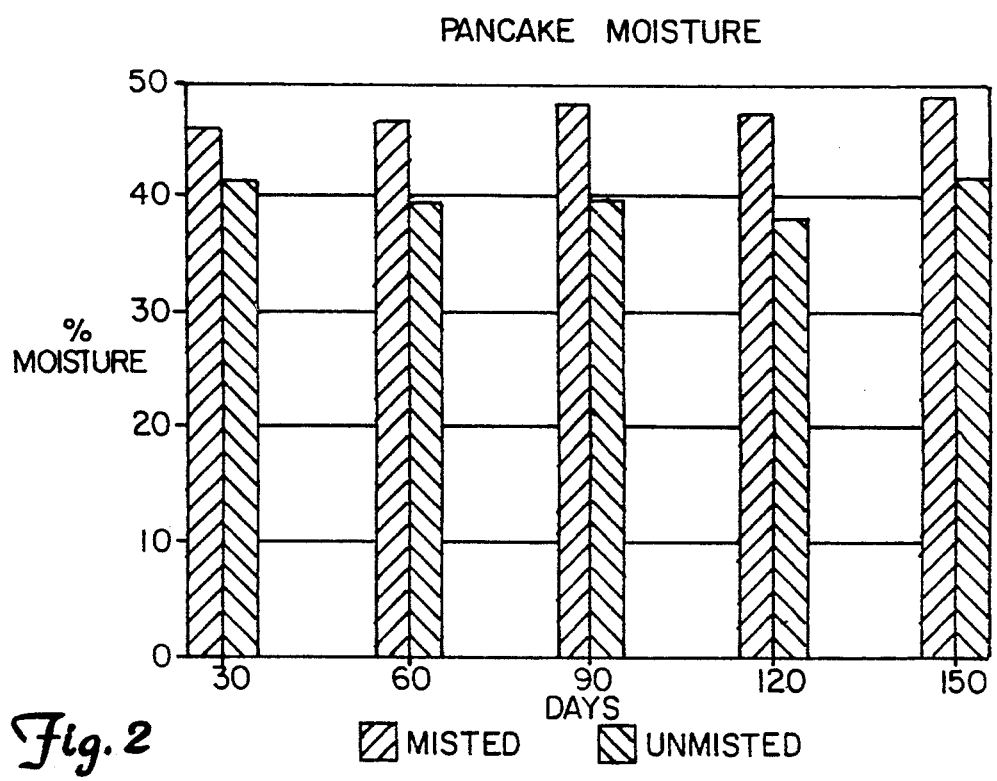
FIG. 2 is a graphical view illustrating pancake moisture levels over a 150 day interval.

The misted pancakes of the present invention were tested for moisture content after the misted pancakes were frozen. A control group of unmisted, frozen pancakes was also tested for moisture content. A profile of the moisture content of misted pancakes of the present invention over time is illustrated in FIG. 2. FIG. 2 also includes a profile of moisture content of unmisted pancakes.

The moisture content of the misted pancakes remained about 7% higher than unmisted pancakes throughout a six month period following the making of the pancakes and the freezing of the pancakes. The moisture data, illustrated in FIG. 2, indicates that once the pancakes are misted, the moisture added by spraying is not lost over the time interval when the pancakes are frozen.

Figure 3:
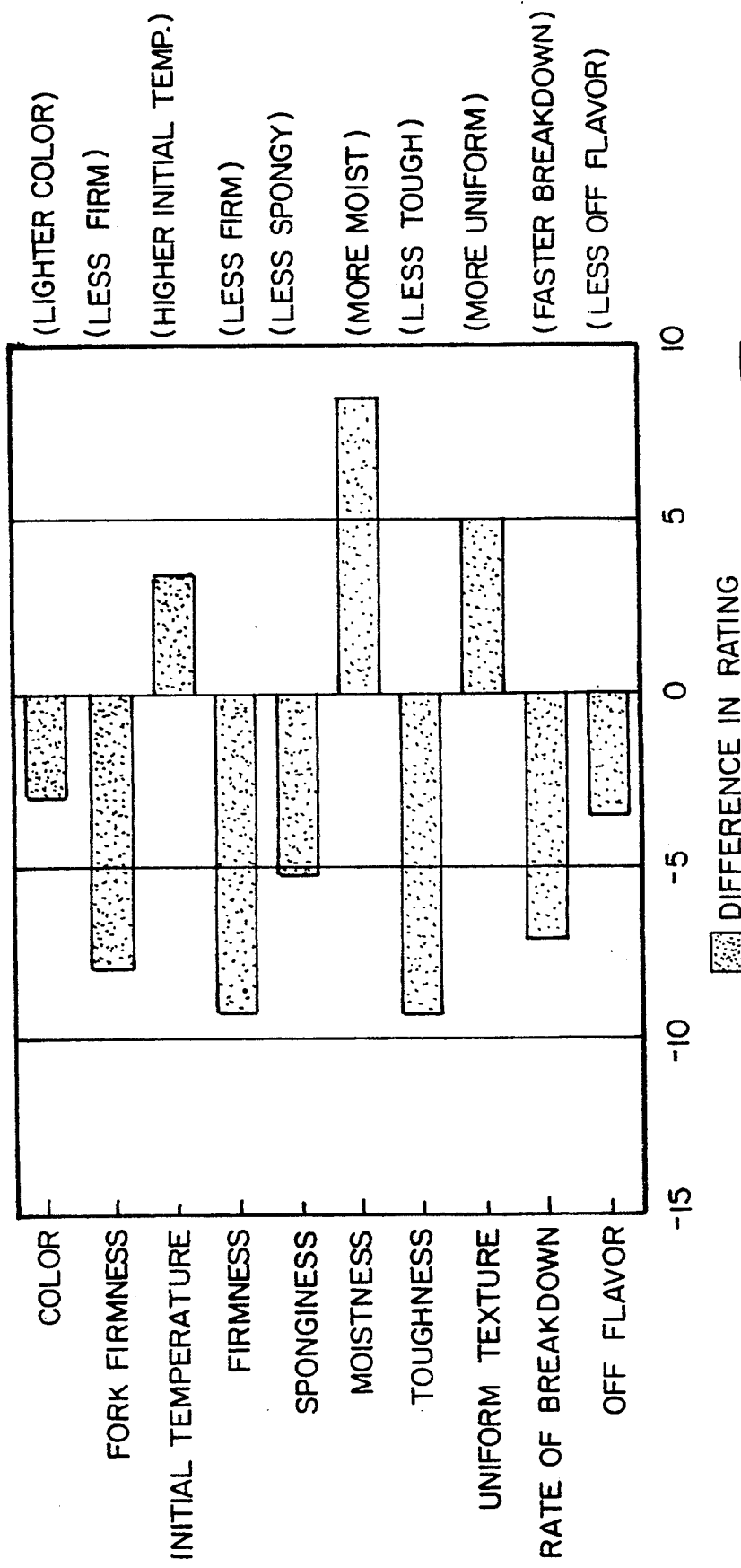
FIG. 3 is a graphical view illustrating a magnitude of hedonic effects due to misting pancakes prior to freezing pancakes.

The misted pancakes of the present invention were more tender than the unmisted pancakes when heated in a microwave oven, as measured by a sensory panel in a hedonic test and illustrated in FIG. 3. The sensory panel also concluded that the misted, microwave-heated pancakes were less tough, had a higher perceived moisture and had a faster rate of breakdown in the mouth than the unmisted, microwave-heated pancakes. Also, the panel did not report any differences in flavor between misted and unmisted pancakes.

The panel testing the pancake of the present invention included 72 members. The members on the panel owned microwaves, liked buttermilk pancakes and ate buttermilk pancakes. The panel members were served microwavable pancake products. The microwavable pancake products included a cooked buttermilk pancake made with the formula described in Table 1 and treated with water to increase the moisture by 6-t-12% (a "misted pancake"). The microwavable pancake products also included a cooked buttermilk pancake made with the formula described in Table 1, but not treated (an "unmisted pancake").

Each panel member ate samples from the microwave-heated pancake products. The samples were served in a random sequential monadic order. Butter and syrup were provided, and panel members were instructed to prepare the pancakes as they normally would. After tasting the pancakes, the panel members rated the pancakes for overall liking, tenderness and several other attributes. Data variants were analyzed by an analyses of variance to determine which samples differed significantly on the attributes tested. Data was statistically significant if the data fell within a 95% confidence level.

The panel liked the misted pancakes significantly more than the unmisted pancakes. Also, the panel liked the texture and flavor of the misted pancakes more than the unmisted pancakes. The panel liked the color of the misted pancakes to about the same degree as the unmisted pancakes. The panel rated the toughness/tenderness, lightness/darkness and moistness of the misted pancakes as "just about right". The panel rated the unmisted pancakes as tougher and drier than the misted pancakes.

Data variants obtained in the hedonic test were also analyzed with a Student-Newman-Keuls (SNK) statistical analysis. Data was statistically significant if the data fell within a 95% confidence level. The misted pancakes received a hedonic score of 6.0 in the SNK test. The misted pancakes were rated significantly higher than the unmisted pancakes that scored only 5.1 with respect to overall liking. The texture of the misted pancakes also scored significantly higher than the texture of the unmisted pancakes. The results obtained from the SNK statistical analysis are described in Table 5.

TABLE 5

|  | Misted | Unmisted |
|---|---|---|
| Overall Liking* Dislike-Like | 6.0 | 5.1 |
| Liking of Appearance Dislike-Like | 6.4 | 6.1 |
| Liking of Pancake Color Dislike-Like | 6.7 | 6.6 |
| Liking of Flavor* Dislike-Like | 6.0 | 5.1 |
| Liking of Texture* Dislike-Like | 5.8 | 4.4 |
| Lightness/Darkness* Too Light-Too Dark | 3.0 | 3.2 |
| Dryness/Moisture* Too Dry-Too Moist | 3.1 | 2.3 |
| Toughness/Tenderness* Too Tough-Too Tender | 3.0 | 1.9 |
| Sweetness Not Enough-Too Sweet | 2.9 | 2.8 |

The designation of an * in Table 5 denotes features that were significantly different at a 95% confidence level.

Although the present invention has been described with reference to preferred embodiments, workers skilled in the art will recognize that changes may be made in form and detail without departing from the spirit and scope of the invention.

What is claimed is:

1. A cooked microwavable pancake comprising a batter water content and a misted water content of about 6-12% of pancake weight, the cooked pancake having an Accuforce shear within a range of about 0.4-to-0.7 pounds, for at least about 100 days after the pancake has been frozen and a total moisture level of about 45%-to-52% by weight which remains substantially unchanged for at least about 100 days after the pancake has been frozen.

* * * * *

UNITED STATES PATENT AND TRADEMARK OFFICE
CERTIFICATE OF CORRECTION

PATENT NO.  : 5,447,739
DATED       : September 5, 1995
INVENTOR(S) : Emanuelson et al.

It is certified that error appears in the above-indentified patent and that said Letters Patent is hereby corrected as shown below:

Column 2, line 3, delete the word "he" and replace it with --the--.
Column 7, line 13, delete the phrase "6-t-12%" and replace it with --6-to-12%--.

Signed and Sealed this

Third Day of March, 1998

Attest:

BRUCE LEHMAN

*Attesting Officer*    *Commissioner of Patents and Trademarks*